United States Patent [19]
Ziolko et al.

[11] 3,781,058
[45] Dec. 25, 1973

[54] SHOCK AND VIBRATION DAMPENING MOUNT ASSEMBLY

[75] Inventors: Walter Ziolko, Willow Springs; Paul F. Stoeck, Wood Dale, both of Ill.

[73] Assignee: International Harvester Company, Chicago, Ill.

[22] Filed: Mar. 3, 1972

[21] Appl. No.: 231,568

[52] U.S. Cl............... 296/35 R, 180/89 A, 248/15, 267/63 R, 267/85
[51] Int. Cl........................................... B62d 27/04
[58] Field of Search .................. 296/28 C, 35 R; 180/89 A; 248/15, 22, 358; 267/80, 85, 63 R

[56] References Cited
UNITED STATES PATENTS

| | | | |
|---|---|---|---|
| 2,212,142 | 8/1940 | Austin et al. | 248/22 |
| 149,951 | 4/1874 | Palmer | 267/63 R |
| 2,838,339 | 6/1958 | Schaldenbrand | 296/35 R |
| 3,642,316 | 2/1972 | Porth et al. | 296/28 C |
| 2,519,364 | 8/1950 | Fredholm | 254/86 |
| 3,352,598 | 11/1967 | Anderson | 296/35 R |
| 3,051,259 | 8/1962 | Lorenz | 180/89 A |
| 2,733,916 | 2/1956 | Dentler | 267/63 R |

FOREIGN PATENTS OR APPLICATIONS

| | | | |
|---|---|---|---|
| 521,274 | 5/1940 | Great Britain | 267/63 R |
| 530,630 | 12/1940 | Great Britain | 267/63 R |

Primary Examiner—David Schonberg
Assistant Examiner—Leslie J. Paperner
Attorney—Floyd B. Harman

[57] ABSTRACT

A plurality of elastomer means of varying deflection rates arranged such that vertical shock and dampening is achieved by a first low and a second high deflection rate means, lying in the same parallel plane. Both elastomer means have generally flat top and bottom faces, the second elastomer means being thinner than that of the first and positioned in close proximity thereto.

14 Claims, 8 Drawing Figures

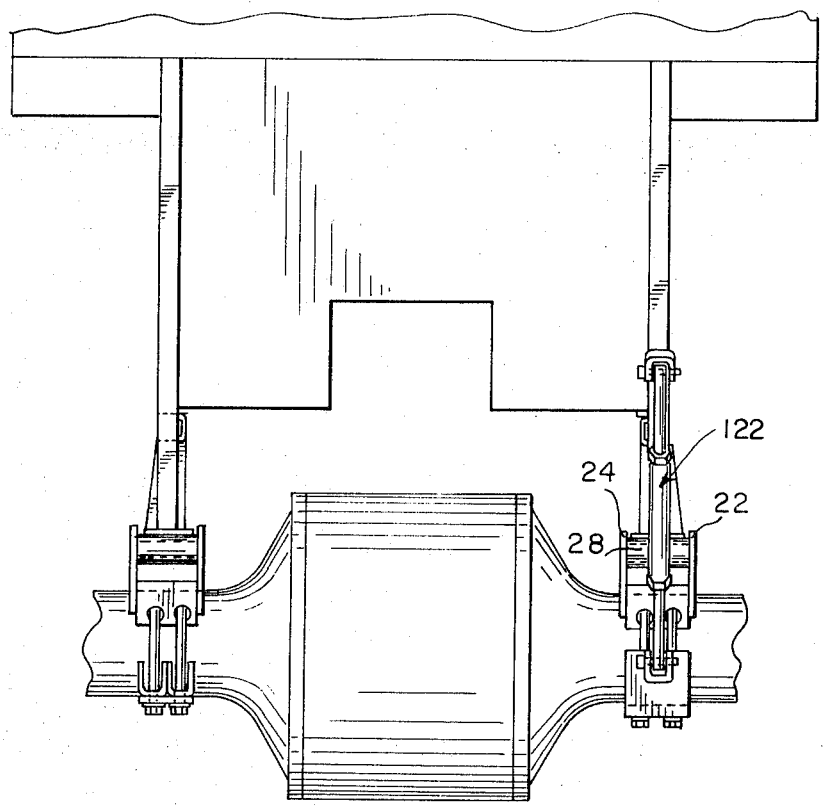
Fig. 2.
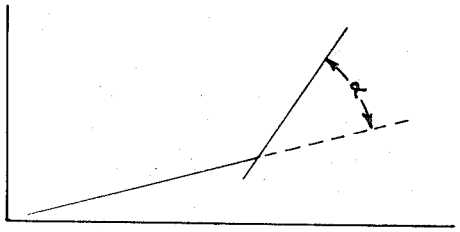
Fig. 8.
Fig. 3.
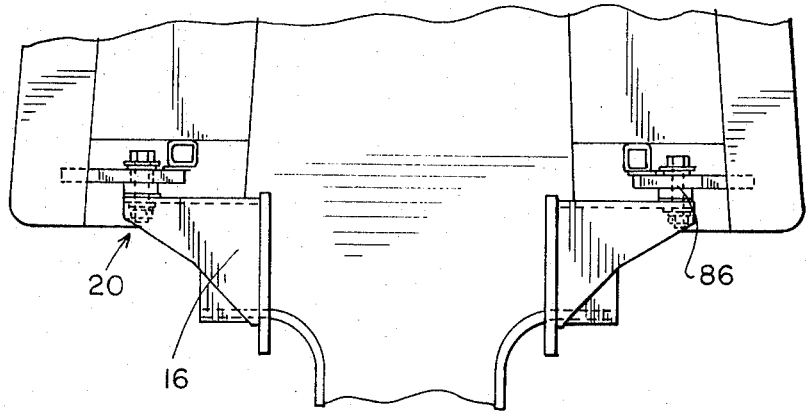

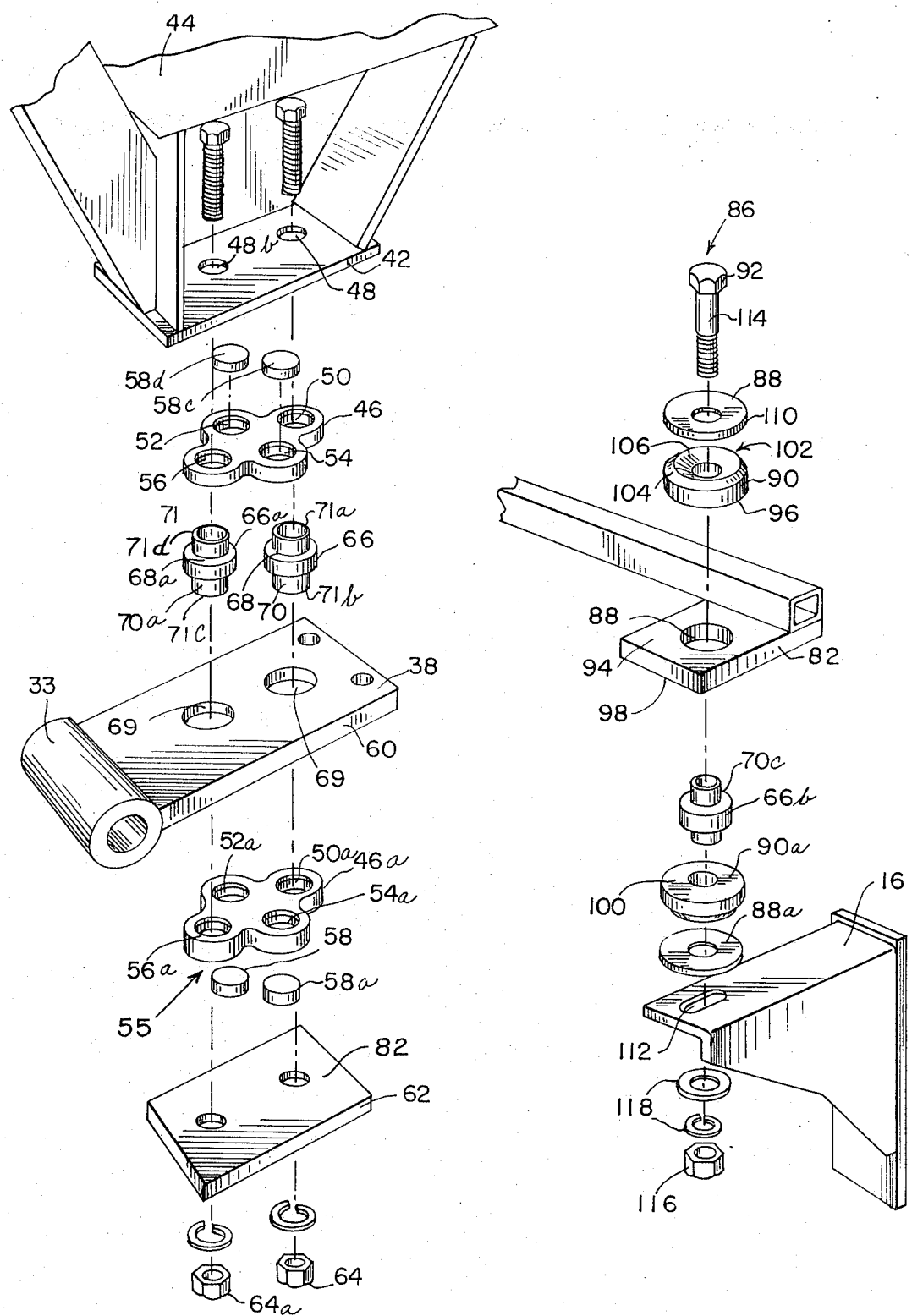

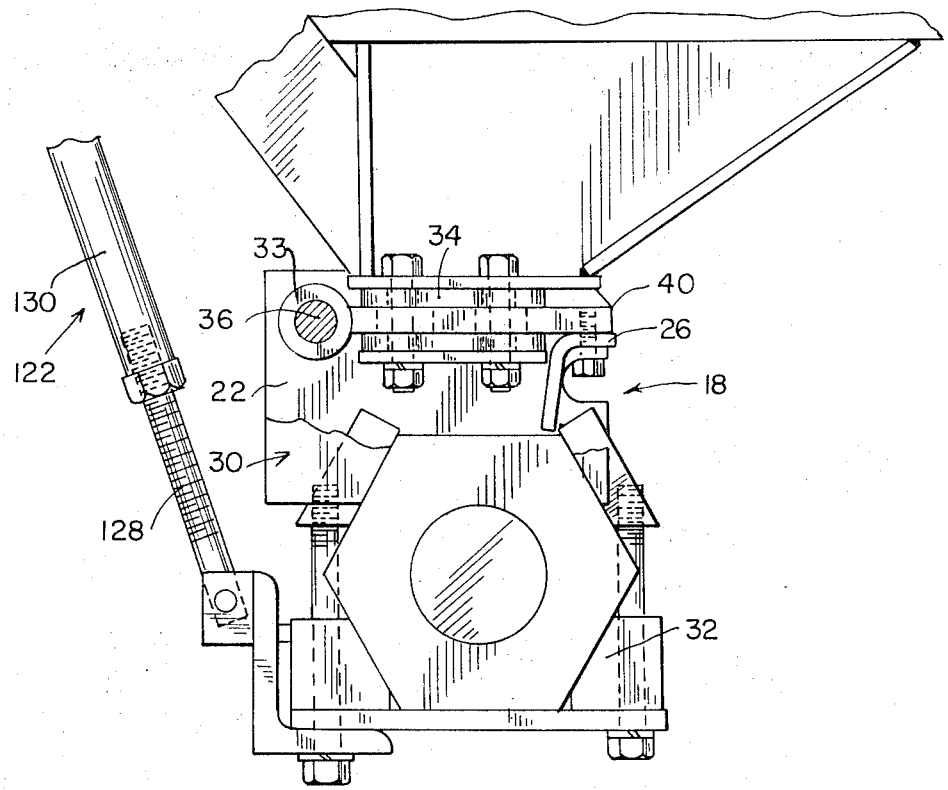

SHOCK AND VIBRATION DAMPENING MOUNT ASSEMBLY

BACKGROUND OF THE INVENTION

This invention relates to a shock and vibration dampening mount for insulating an operator environment structure. More particularly this invention is directed to an elastomer material assembly for insulating a tractor cab against heavy shock and vibration.

Methods for insulating parts of a vehicle against surface induced shock are well known in the art. For the most part, such methods involve a means having a spring like nature, such as coiled steel, etc. The spring means providing a resistance to shock which is substantially proportional to the magnitude thereof. Thus, if the vehicle is to be subjected to periodic heavy shocks, a spring means having a high spring rate is employed, while if only light shocks are involved a low spring rate material is employed. As is apparent, insulating against shocks of mixed intensity with a high spring rate means would result in a high transmission of noise producing vibrations while a low spring rate means providing good insulation against noise producing vibrations would have a limited effect against heavy shock and such an assembly would result in structural damage and be generally undesirable.

Isolation mounts of elastomer material are frequently used in preference to steel spring mounts because of the preferred inherent internal dampening characteristics of the elastomer material. This characteristic minimizes rebound and resonance through internal energy absorption.

Various shaped elastomer mounts have been developed in an attempt to provide a variable load-deflection rate. An example of these means is the well known conical top design which provides a variable load-deflection rate by its support area increase as additional load is applied. The success of these means has been limited by allowable stress levels in the reduced area upper portion of the conical shape. Other single unit shapes such as stepped configurations have also had limited success because of destructive stresses in the low load-deflection rate portion of the mount in practical use. A further limitation of the single unit design is the interaction of all portions of the shape making a sudden change in load deflection rate impossible.

This invention relates to an assembly of two yieldable means each having an independent load deflection rate and each functioning independently of the other, the first means to absorb vibration and the combination of the first and second means to absorb shock. The overall effect being that high and low magnitude shocks and vibrations are absorbed in a step manner dependent on magnitude of the forces involved. The operator environment and protective structure as in the preferred embodiment a cab means, is secured to the vehicle such that there is no metal to metal contact between said cab and said vehicle. First and second means are provided to absorb vertical shock and dampen vibration while a third means cushions horizontal movement.

It is therefore an object of this invention to provide a protective shock and vibration absorption assembly having elastomers of a varying load deflection rate.

Yet another object of this invention is to provide a protective shock and vibration absorption assembly capable of controlling shocks and vibrations of mixed intensities.

Still another object of this invention is to provide a shock and vibration absorption assembly having an extended useful life.

Another object of this invention is to provide a tractor cab assembly having a shock and vibration dampening mounting system.

Yet another object of this invention is to provide a shock and vibration absorption means having several units of different durometer functioning independently of each other.

Still another object of this invention is to provide a shock deflection mounting system which allows the cab to be simply displaced.

Yet another object of this invention is to provide a cab mounting system which is provided with a simple cab displacing means.

Another object of this invention is to provide a cab mounting assembly which lessens flex and deflection of the cab structure.

Yet another object of this invention is to provide a mounting assembly which insulates the cab structure from vibrations, shock and twisting action.

Still a further object of this invention is to provide a multi-load-deflection rate shock and vibration assembly which has a long useful life, compact and easily replaced.

Yet another object of the invention is to provide a multi-load-deflection rate shock and vibration mount assembly which can be tailored to fit a variety of shock load and vibration categories.

While the invention will be described in connection with a preferred embodiment it will be understood that it is not intended to limit the invention to that embodiment. On the contrary, it is intended to cover all alternatives, modifications and equivalents as may be included within the spirit and scope of this invention as defined by the appended claims.

BRIEF DESCRIPTION OF THE DRAWINGS

FIG. 2 is a back elevational view of the cab and mounting assembly of FIG. 1;

FIG. 3 is a front sectional view of the cab mounting assembly of FIG. 1;

FIG. 4 is an exploded view of the rear mounting unit;

FIG. 5 is an exploded view of the front mounting unit;

FIG. 6 is a side sectional view of the rear mounting assembly of FIG. 1;

FIG. 7 is a side sectional view of the rear mounting unit of FIG. 1 showing the relative thicknesses of the elastomer means; and FIG. 8 is a load-deflection curve used in explanation of the invention.

DESCRIPTION OF THE PREFERRED EMBODIMENT

Figure 1:
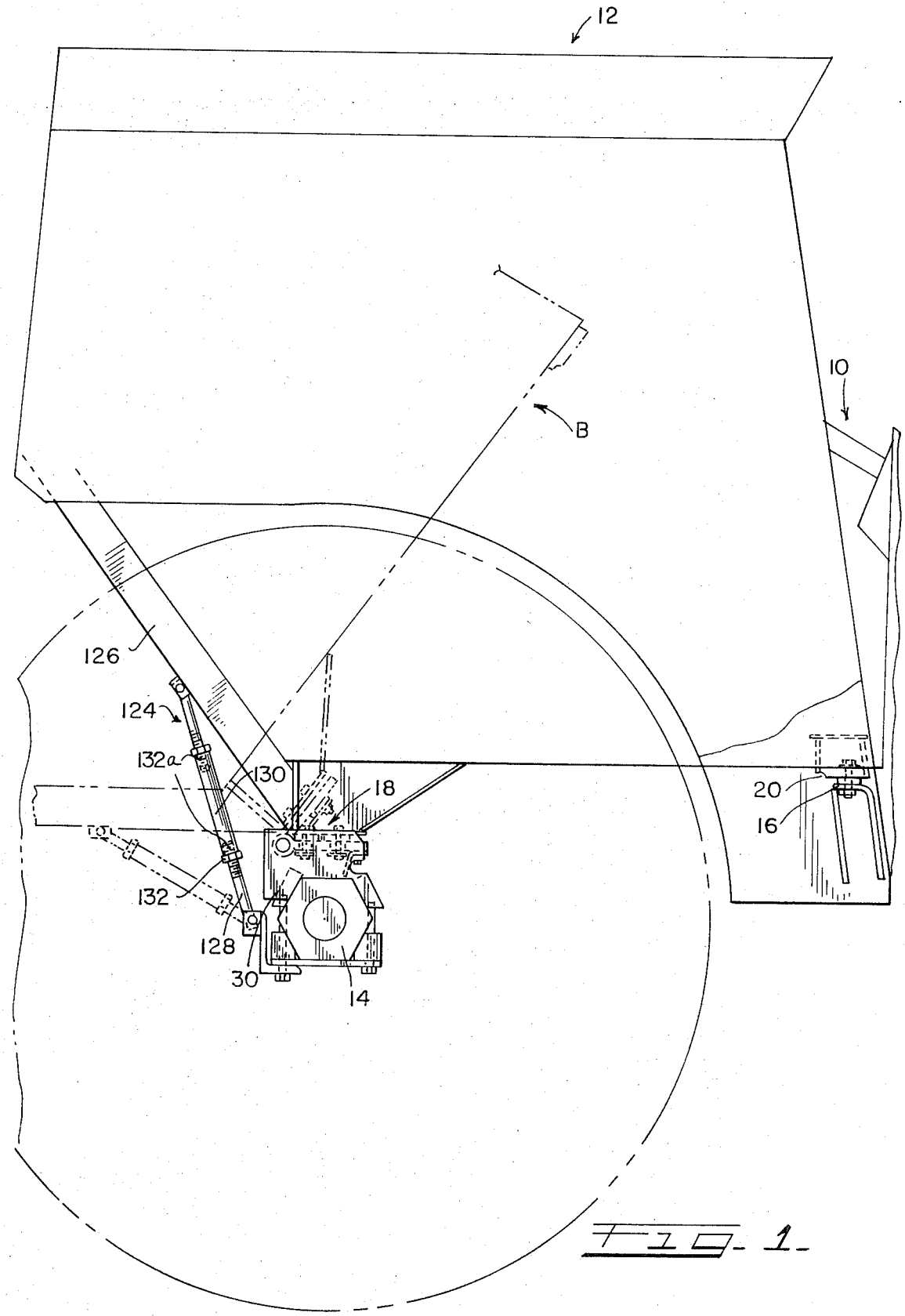
FIG. 1 is a side fragmentary view of a tractor showing a cab mounted on the shock and vibration dampening assembly and a phantom view B thereby in the tilted back position.

Referring now to the drawings and more particularly to FIG. 1 wherein number 10 designates a tractor and number 12 a cab means which is affixed to axle 14 and front tractor frame support means 16 by rear mounting means 18 and front mounting means 20, respectively. As is apparent, as viewed, as three shock and vibration means may be used, in this embodiment four such means are involved, however, both rear means are identical to each other as are the front mounting means. For the sake of simplicity, only one of the pair of rear and front mounting means will be discussed, each pair thereof being identical. It is to be understood a cab member is the preferred embodiment, however, any operator environment structure means may be so isolated. Operator environment structure includes cabs, protective structures, etc.

The rear mounting means 18 includes: spaced parallel wall means 22 and 24, bridge or cross means 26 and 28 joining said walls and thus forming an apertured bracket 30 suitable for bolted engagement with axle carrier means 32; a shock dampening hinge assembly means 34 positioned within said apertured bracket 30 and being pivotally fixed at first end 33 with a suitable bolt means 36 and fixedly secured to cross means 26 at second end 38 with a suitable bolt means 40.

As shown in FIG. 4, said vibration and shock dampening hinge assembly 34 includes: top plate backing means 42 having apertures 48a and 48b which is welded or otherwise suitably secured to the cab frame means 44; first elastomer means 46 and 46a having at least several apertures 50, 52, 54 and 56; second elastomer means 58, 58a, 58b and 58c; an apertured plate means 60; a thrid elastomer means 66 and 66a; a free floating bottom plate means 62; and bolt and nut means 64 and 64a. It should be apparent however, that hinged plate means 60 may be immovably welded to the vehicle or as in the preferred embodiment, a hinged plate means.

Since elastomer means 46 and 46a are identical, further discussion will be limited to elastomer means 46, which in the preferred embodiment is an elastomer having a load-deflection rate of from about 8,750 to about 14,750 pounds per inch of deflection, the preferred value being about 11,750 pounds per inch of deflection. As shown in FIG. 4, elastomer means 46 is generally oval shaped with generally flat top and bottom face means, although other shapes could be employed.

The second elastomer or pellet means 58, 58a, 58b and 58c are similar and, in the preferred embodiment, are elastomer and more specifically, rubber. The assembly of two pellets has a load-deflection rate of from about 3,400 to about 20,000 pounds per inch of deflection, the preferred value being about 12,000 pounds per inch of deflection.

The third elastomer means 66 and 66a are identical and further discussion will be limited to means 66 which, in the preferred embodiment, is an elastomer having a load deflection rate of from about 4,000 to about 20,000 pounds per inch of deflection, the preferred value being about 6,000 pounds per inch of deflection. Centrally located apertures 68 and 68a are provided through each of said elastomer means and are journaled by sleeve means 70 and 70a. It should be noted that the elastomer means 66 and 68a are not bonded or secured to sleeves 70 and 70a, thus there are only minimal sheer forces involved, the forces being rather compressive in nature.

It is thus apparent that elastomer means 46 and 58 comprise a shock and vibration dampening mount means 55 which protect the cab means from vertical shock and dampen vibration. The third elastomer means 66 simultaneously therewith insulating against horizontal shock and vibration. It should also be understood that when the vehicle is subjected to heavy shock both the first and second elastomer means will be employed to counteract it. Thus, the counteracting forces are supplied by a combination of the load-deflection rates of said first and second elastomer means. FIG. 8 illustrates in graphic form the sudden change of load-deflection rate achieved with this invention. It is apparent that the load-deflection curve can be readily tailored to meet other shock load and vibration categories by changing the durometer of one or both of the elastomer elements. That is, the total load-deflection rate increases to from about 25 percent to about 300 percent above the load-deflection rate of said first elastomer means 46, depending on the value of said second elastomer means 58.

The components of said hinge assembly are positioned in a sandwich like relationship against the top and bottom face means 61 and 65 of hinge plate 60. Hinge plate 60 is pivotally secured to bracket 30 and bolt and nut means 64 and 64a being passed through each set of corresponding adjacent apertures. Said bolt means are secured with hex nuts and torqued to the desired degree thereby pre-loading the low durometer first elastomer mans 46 and 46a. As is apparent, the degree to which said bolt and nut means 64 and 64a can provide compression of the elastomers will be determined by the length of said sleeve means 70 and 70a, since at some point, ends 71a, 71b, 71c and 71d thereof will abut the faces 80 and 82 of plates 42 and 62. In practice, the sleeve lengths serve as a convenient gauge for preload determinations. The second elastomer means 58, 58a, 58b and 58c (in the preferred embodiment) are secured in the same plane as the corresponding first elastomer means 46 and 46a, being placed in convenient apertures 52, 52a, 54 and 54a located in said first elastomer means 46 and 46a said apertures having tapered edges 45 and 45a as shown in FIG. 7. The thickness of the flat topped and flat bottomed pellet or second elastomer means 58 is less than that of the pad or first elastomer means 46, such that normal vibration and shock is carried by the pad means 46, the pellet means only coming into play to counteract heavy shocks. Thus, a soft mounting is provided and simultaneous heavy shocks are buffered by the additive deflection rate of the pellets before the destructive limit of the low deflection rate of the pads alone is reached or structural damage is inflicted on the cab. As is apparent, if the load-deflection rate of the elastomer pad 46 is too low the cab structure would be subjected to excessive flexing and rocking which would result in damage to the cab weather seals, etc.

It should be noted that the apertures 50, 50a, and 56 and 56a in first elastomer means 46 and 46a have tapers 43, 43a, 43b and 43c such that when the assembly is torqued tight, there is no pinching or unusual distortion of the elastomer in this area. Distortion in this area would effect the load-deflection rate in an uncontrollable manner such that the same rates could not be easily repeated.

In operation the hinge means 60, which is pivotally fixed to bracket means 30, is carried in sandwich fashion by and between first elastomer means 46 and 46a, and second elastomer means 58, 58a, 58b and 58c such that all vertical shock and vibration are dampened thereby. Further, transmission of horizontal vibration is dampened by the interposition in apertures 69 and 69a of third elastomer means 66 and 66a between hinge means 60 and bolt and nut means 64 and 64a. It is thus apparent that each elastomer means serves a distinct function yet in combination result in a high noise attenuation and limits high shock load-deflection of the structure.

As shown in FIG. 5, the front mounting means includes cab support means 82, tractor frame support means 16 which is, in turn, bolted to the tractor frame (not shown) and front elastomer assembly means 86. The front elastomer assembly 86 includes: backing washer means 88 and 88a; elastomer vibration and shock mount or pad means 90 and 90a; and front third shock means identical to and serving the same function as third elastomer means 66 and designated as 66b; and a nut and bolt means 92 journaling said means.

The cab support means 82 is fixed to the tractor frame 16 and provided with an aperture 88 which is journaled by said front third elastomer means 66b. The top face 94 of said cab support means 82 is adjacent and coextensive with lower flat face means 96 of upper elastomer vibration and shock mount means 90, the lower face 98 thereof existing in a similar relationship with flat face means 100 of lower elastomer means 90a.

The upper and lower means 90 and 90a are identical and serve the same function, thus the discussion will be limited to means 90. The top face 102 has a shoulder portion 104, and a dished portion 106, whereby the amount of compressed surface employed during dampening depends on the magnitude of the shock involved. That is, the greater the vibrational force, the more elastomer means 90 flattens out and the more of the top face 102 with its increased load-deflection rate is employed to absorb the force. Thus, the elastomer pad means 90 contacts the bottom 110 of backing washer means 88 sufficiently to provide isolation, yet absorb heavy shocks while achieving an extended useful life.

As previously discussed, the stated means are journaled by nut and bolt means 92. In practice, an aperture 112 is provided in tractor frame mounting means 16 which is journaled by the shaft of nut and bolt means 92. Washer means 118 are provided over the end of bolt means 114 and a nut 116 is threadingly engaged therewith. As is apparent, the front spacer means 70c serves as a convenient elastomer preload means.

In operation, the elastomer means 90 and 90a dampen axial vibration and shock while the front third elastomer means 66b dampen radial vibration and shock.

A cab displacement means 122 is provided having a first section 124 pivotally secured to the back 126 of the cab frame and a second section 128 pivotally secured to bracket means 30.

The sections 124 and 126 threadingly journaling a sleeve means 130 such that upon rotation of the sleeve 130, the sections 124 and 126 are drawn thereinto.

Bolt head means 132 and 132a are provided with a wrench or tool facilitating means. As is apparent upon actuation, the sections 124 and 126 are pulled, threaded into sleeve 130 and the cab means pivots backwards on rear mounting means 18 exposing the equipment thereunder. The hinge means 30 of rear mounting 18 occupying as it does the center of the spring sandwich structure thus pivoting around bolt means 36 as achieved.

A further advantage gained by this assembly is that the entire cab frame 12, since it is provided with third type elastomer means 66, can be self-aligning. That is, if any part of the assembly is misaligned, upon torquing, the elastomer portion of third type elastomer means 66 flows to provide realignment without increased shock or vibration transmission.

As shown in FIG. 8 the slope of the load deflection curve of elastomer means 46 is reasonably low in order to provide the required vibration isolation. The slope of the combined load deflection rate of elastomer means 46 and 58 is high in order to provide suitable shock isolation. The intersection of the curve of elastomer means 46, having a slope described by $m = y-b/x$ and the curve of combined elastomer means 46 and 58 having a slope described by $m_1 = y_1-b_1/x_1$ defines an angle $\alpha$. For best results we have found that angle $\alpha$ may vary from about 10 to about 60°.

Although the invention has been described in connection with certain specific embodiments, the principles are susceptible of numerous other applications that will readily occur to those skilled in the art. The invention is, therefore, to be limited only as indicated by the scope of the appended claims.

Having thus described the various features of the invention, what I claim as new and desire to secure by Letters Patent is:

1. A shock and vibrational dampening mount means comprising:
   a nonrestricted first apertured low load-deflection rate elastomer means; and
   a second high load deflection rate elastomer means positioned in said apertures said second elastomer being thinner than said first elastomer means and functioning independently thereof whereby the slope of the load deflection curve of said first elastomer means intersects the combined load deflection curve of said first and second load deflection curves forming an angle of from about 10 to about 60°, and said first elastomer means dampens vibrations and and said second elastomer means dampens shock.

2. A shock and vibration dampening mount means comprising:
   a nonrestricted first apertured low load-deflection rate elastomer means; and
   a second high load deflection rate elastomer means positioned in said apertures, said second elastomer means being thinner than said first elastomer means whereby said second elastomer means functions only after substantial compression of said first means, such that said first elastomer means dampens vibrations and said second elastomer means dampens shock.

3. The shock and vibration dampening mount means of claim 2 wherein when said second elastomer functions the sum of the load-deflection rates thereof is from about 25 percent to about 300 percent above the load-deflection rate of said first elastomer means.

4. The shock and vibration dampening mount means of claim 2 wherein said first elastomer means has a generally flat top and bottom face means and a load-deflection rate of from about 8,750 to about 14,750 pounds per inch of deflection; and said second elastomer means has a generally flat top and bottom face means and a load-deflection rate of from about 3,400 to about 20,000 pounds per inch of deflection.

5. A shock and vibration dampening mount assembly for isolating an operator environment structure from the supporting vehicle comprising:
- a first set of apertured low durometer elastomer means having a generally flat top and bottom face means;
- a second set of high durometer elastomer means being positioned in said apertures of said first elastomer means having a generally flat top and bottom face means, said second elastomer means being thinner than said first elastomer means whereby said second elastomer means functions only after substantial compression of said first means;
- a plate means secured to said supporting vehicle and having a top and bottom face, whereby one of said first elastomer set means carrying said second elastomer set means is positioned adjacent said top face and another is secured adjacent said bottom face, such that said first set of elastomer means dampens vibration and said second set of elastomer means dampens shock, said operator environment structure being supported thereon.

6. The shock and vibration dampening mount assembly of claim 5 wherein:
- said plate means is apertured,
- said apertures being provided with bolt means securing said plate means to said environment structure, said bolt means being isolated from said plate means by a third elastomer means.

7. The shock and vibration dampening mount assembly of claim 6 wherein:
- said third elastomer means is journaled by a sleeve means, said bolt means journalling said sleeve means, and having a load deflection rate of from about 4,000 to about 20,000 pounds per inch of deflection.

8. An operator environment structure mounting assembly insulating an operator environment structure from a vehicle for reduced vibration and shock transmissions thereto comprising:
- front and rear bracket means secured to said vehicle;
- rear mounting means securing said structure to said rear bracket, including first and second set of elastomer means, one being thinner than the other, having different load-deflection rates and at least two of which lie in common planes, whereby said thinner elastomer means dampens shock and said other elastomer means dampens vibrations; and
- front mounting means securing said structure to said front bracket means including first and second of elastomer means having different load deflection rates and arranged in sandwich like fashion.

9. The mounting assembly of claim 8 wherein said rear mounting means includes:
- an apertured plate having a top and bottom face means and being secured to said rear bracket;
- a series of first and second elastomer means, a first set of first and second elastomer means horizontally contacting said top face and a second set horizontally contacting said bottom face means whereby vibration is dampened; and
- said operator environment structure is a tractor cab means.

10. The mounting assembly of claim 9 wherein said rear mounting means includes:
- a series of second elastomer pellet means carried by said first elastomer means and having a thickness less than that of said first elastomer means whereby only high shock loads are counteracted thereby, while vibrational dampening is achieved by said first elastomer means.

11. The mounting assembly of claim 9 wherein said apertured plate includes:
- a series of third elastomer means carried in said apertures.

12. The mounting assembly of claim 11 wherein said rear mounting means includes a first elastomer means having a load deflection rate of from about 8,750 to about 14,750 pounds per inch of deflection, a second elastomer means having a load deflection rate of from about 20,000 to about 34,000 pounds per inch of deflection per assembly and a third elastomer means having a load deflection rate from about 4,000 to about 20,000 pounds per inch of deflection.

13. The mounting assembly of claim 12 wherein said tractor cab means is displaceable and includes:
- a displacement means comprising:
- a threaded first section secured to said tractor cab;
- a threaded second section secured to said rear bracket means; and
- a sleeve means being threadingly journalled by said first and second sections whereby when said sleeve is rotated said first and second threaded sections are pulled into or out of said sleeve means.

14. A hinged shock and vibration dampening assembly connecting a tractor cab frame member to a vehicle for insulating against shock and vibration comprising:
- rear mount means including:
- an apertured plate means having a first and second surface;
- a plurality of apertured elastomer means positioned in said apertures of said plate means whereby providing horizontal dampening;
- a pair of apertured elastomer means positioned opposite such that one contacts said first surface and one said second surface of said plate means, said apertures carrying a plurality of pellet elastomer means such that said pellet means is employed only when said body member is subjected to heavy shock; and
- a fastening means securing said cab frame member to said apertured plate through said elastomer means;
- front mount means including: an apertured front tractor frame support means;
- front elastomer means including a pair of apertured elastomer means positioned on opposite sides of said front tractor frame means, each of said elastomer having a first flat face and a second face which includes a beveled portion, a flat portion and a dish portion, said first flat faces contacting said apertured front tractor frame means, a pair of apertured flat plate means oppositely disposed and positioned on said faces;
- an apertured elastomer means positioned in said aperture of said apertured front tractor frame means whereby providing horizontal dampening; and
- a fastening means securing said elastomer means to said front frame means.

\* \* \* \* \*